G. HOBSON.
GRAIN BOX.
APPLICATION FILED JAN. 4, 1918.
1,289,172. Patented Dec. 31, 1918.
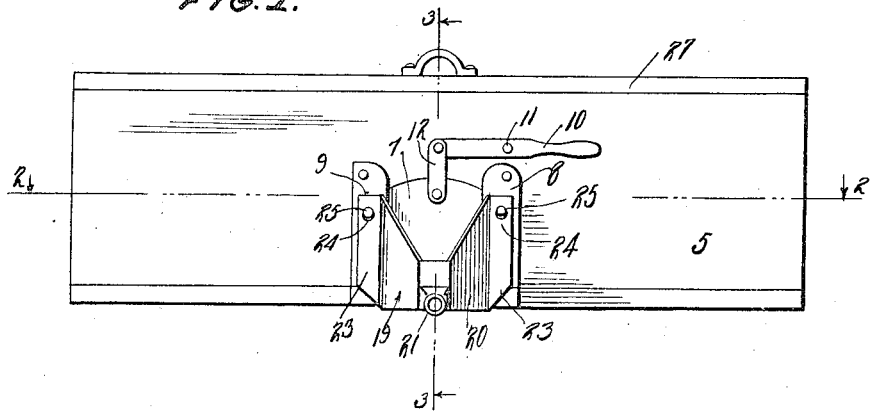
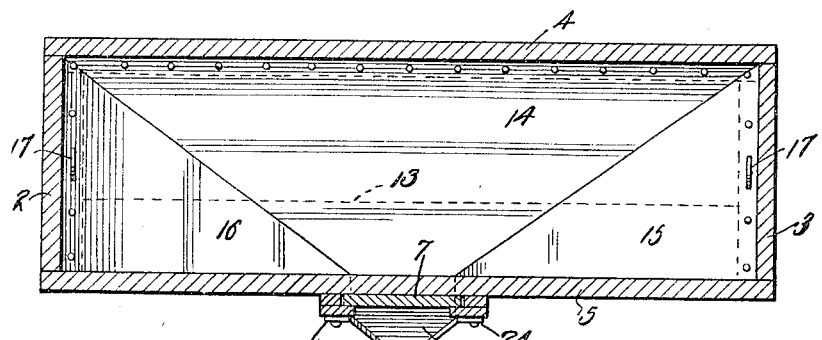
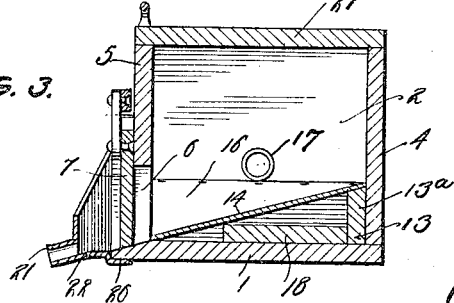
WITNESSES
W. E. Fielding.
H. H. Babcock.
INVENTOR
George Hobson
BY Richard Owen.
ATTORNEY

UNITED STATES PATENT OFFICE.

GEORGE HOBSON, OF REGINA, SASKATCHEWAN, CANADA.

GRAIN-BOX.

1,289,172.

Specification of Letters Patent. Patented Dec. 31, 1918.

Application filed January 4, 1918. Serial No. 210,398.

*To all whom it may concern:*

Be it known that I, GEORGE HOBSON, a subject of the King of Great Britain, residing at Regina, in the Province of Saskatchewan and Dominion of Canada, have invented certain new and useful Improvements in Grain-Boxes, of which the following is a specification.

This invention relates to grain boxes, and more particularly to a grain box specially constructed for supplying grain to the seed cans of hoppers of planters and similar machines.

One of the main objects of the invention is to provide a box which may be used as a wagon box in the ordinary manner, and may be quickly and easily converted into a grain box specially constructed for discharging grain or seed into the seed cans of a planter. A further object is to provide a discharge spout for directing the grain from the box into the can, simple and efficient means being provided for detachably securing this spout in operative position. Another object is to provide a false bottom for the box so constructed as to direct the grain toward the outlet or discharge opening. Further objects will appear from the detailed description.

In the drawings:

Figure 1 is a side view of a box constructed in accordance with my invention.

Fig. 2 is a section taken substantially on line 2—2 of Fig. 1.

Fig. 3 is a section taken on line 3—3 of Fig. 1.

The body of the box is of ordinary construction being provided with the bottom 1, ends 2 and 3, and sides 4 and 5. The side wall 5 is provided, at its longitudinal center, with a discharge opening 6. This opening is normally closed by a gate 7 slidable in the vertical guides 8 and 9 secured to the side of the box. A lever 10 is pivoted intermediate its ends, as at 11, on the side of the box, the inner end of this lever being pivotally connected to the gate adjacent the top, and at the transverse center thereof by a link 12. By depressing the outer end of the lever the gate will be raised so as to uncover the discharge opening 6. Normally the gate will be in closed position thus permitting the box to be used as a wagon body or box for hauling purposes in the usual manner.

When it is desired to convert the box into a grain box I provide it with a false bottom of special construction and a discharge spout which is secured in front of the discharge opening 6. The false bottom consists of a three sided base or frame 13 which supports the central triangular shaped bottom plate 14 and the end right angular triangular shaped plates 15 and 16. These plates are formed from sheet metal and are so disposed as to provide a hopper bottom which is inclined from side wall 4 and both of the end walls 2 and 3 downwardly toward the discharge opening 6. To facilitate handling of this false bottom I provide a gripping ring 17 at each end thereof. The frame 13 which supports the false bottom is of such size as to fit snugly within the box, and is provided, adjacent its side rail 13$^a$, with a longitudinally extending reinforcing bar 18. The bar rests upon bottom 1 of the box, and its upper outer corner engages the underface of bottom plate 14 so as to sustain the same. After the false bottom has been placed in position, the grain which is to be planted is poured into the box to the desired amount. This grain will be directed toward the discharge opening 6, as above noted, which is normally closed by gate 7. The discharge spout indicated generally by 19 is mounted in front of the gate 7. This spout is provided with the substantially pyramidal body 20 having the central discharge tube 21, this tube forming a continuation of the inclined bottom 22 of the spout. Laterally projecting flanges 23 are provided at each side of the inner end or base of body 20. Each of these flanges is provided, adjacent its upper end, with a longitudinal slot 24 which is of such size as to receive the head of a securing screw 25 which is secured in the guide for the gate. These slots are so disposed that, by placing the flanges 23 in position adjacent the outer faces of the guides 8 and 9, with the screws 25 inserted through the slots, and then moving the spout into its extreme downward position, the inwardly extending angular flange 26 provided at the inner edge of bottom 22 will fit snugly beneath the edge portion of bottom 1 of the box. The flange 26, together with the bottom 22, acts to hold the spout downwardly due to its resiliency and to firmly but detachably secure it on the box. By raising the gate 7 the grain will flow through opening 6 into the spout and will be directed thereby through the discharge tube 21 into the seed can or other receptacle placed under the same.

In using this device, the recorded amount of seed will be placed in the box which, as will be readily understood, is mounted on a wagon gear in the same manner as a wagon box, after which the box will be hauled to the field where the planting is to be done and placed in any suitable and convenient position. When the supply of grain in the cans or hoppers of the machine with which the planting is to be done becomes exhausted, the feed cans may be readily refilled by the simple expedient of placing them beneath the discharge tube 21 and raising gate 7 in the manner described. When the planting operation is completed, the spout 19 and the false bottom may be readily removed thus permitting the box to be used in the ordinary manner for hauling purposes. If desired, a suitable cover 27 may be provided for the box so as to protect the grain, though I do not deem it necessary to have this cover under ordinary conditions.

It will be seen that I have provided a box of very simple construction and operation which may be easily converted into a wagon box for hauling purposes in the ordinary manner, or may be quickly converted into a grain box of special construction specially adapted for filling the seed cans of grain planters and for similar purposes. It will be evident that there may be slight changes made in the construction and arrangement of the different parts of my invention without departing from the field and scope of the same, and I intend to include all such variations, as fall within the scope of the appended claim in this application in which a preferred form only of my invention is disclosed.

What I claim is:

The combination with a wagon box having an opening in one side wall, a spout beneath the opening, and means for closing the opening when desired; of a false bottom for removable insertion in said box, the bottom comprising a triangular central plate with its base raised and its apex dropped toward the opening in said side wall, two right-angular triangular end plates whose bases are adapted to lie against the end walls of said box, their bodies inclining downward toward the central plate and outlet opening, gripping rings rising from said end plates, a three-sided frame removably inserted in the wagon box beneath the higher edges of said plates, and a reinforcing bar also inserted in said box within and longitudinal of said frame, one edge being against the longer side of the frame and the other edge supporting the triangular central plate.

In testimony whereof I affix my signature in presence of two witnesses.

GEORGE HOBSON.

Witnesses:
WALTER E. ARENS,
ROBERT DAWSON.

Copies of this patent may be obtained for five cents each, by addressing the "Commissioner of Patents, Washington, D. C."